Patented Aug. 11, 1925.

1,549,189

UNITED STATES PATENT OFFICE.

VIGGO DREWSEN, OF LARCHMONT, NEW YORK, ASSIGNOR TO WEST VIRGINIA PULP AND PAPER COMPANY, OF NEW YORK, N. Y., A CORPORATION OF DELAWARE.

PROCESS OF TREATING WASTE MAGNESIUM MONOSULPHITE COOKING LIQUORS.

No Drawing. Application filed April 3, 1922. Serial No. 549,197.

*To all whom it may concern:*

Be it known that I, VIGGO DREWSEN, a citizen of the United States, and resident of Larchmont, county of Westchester, State of New York, have made certain new and useful Improvements Relating to Processes of Treating Waste Magnesium Monosulphite Cooking Liquors, of which the following is a specification.

This application is a partial continuation of my copending case, Serial No. 397,484 filed July 19, 1920, from which parts of this subject matter have been taken.

This invention relates especially to processes of treating the waste monosulphite cooking liquors which are produced in the digestion of straw, corn stalks, wood, and other fibrous material, for the production of paper pulp, etc., so as to recover the valuable inorganic constituents of such liquors and prepare the cooking liquors for reuse in fibre digestion. The waste magnesium monosulphite liquor from the digester, preferably after precipitating out with calcium salts any sulphates or sulphites in the waste liquor, may be treated and preferably boiled with slaked dolomitic lime so that the calcium component thereof precipitates the magnesium hydroxide which has been held in solution in various organic combinations in the waste liquor together with the magnesia of the dolomite lime which may be removed by filter pressing. This precipitated magnesium hydroxide may be transformed into the monosulphite in various ways as by treating it with sulphur dioxide which may be percolated through liquor containing the magnesium hydroxide in suspension so that magnesium monosulphite may be formed for use in cooking the raw fibre. If desired, however, the precipitated magnesium hydroxide may be purified by calcining the same to eliminate therefrom any traces of organic material, and the resulting magnesia may be treated while suspended in water with carbon dioxide under pressure so as to produce magnesium bicarbonate which goes into solution. This solution may then be treated with sulphur dioxide or with magnesium bisulphite in proper proportions so as to form the desired magnesium monosulphite while concentrated carbon dioxide is simultaneously produced which can be used in the preceding step of the process.

In commercially operating this process, the waste magnesium monosulphite liquor from the raw fibrous material may advantageously have the sulphates and also sulphites remaining therein from the original cooking liquor removed by precipitating out with any suitable calcium salts. For this purpose the calcium waste liquor from this recovery process containing calcium organic compounds such as calcium lignosulphonate may be added and stirred into the waste liquor received from the digester so long as a substantial calcium precipitate continues. By filter pressing, this preliminarily removes these sulphates and sulphites which might otherwise contaminate the precipitated magnesium hydroxide formed in the liquor. This purified waste digester liquor may then be treated with calcined and slaked dolomitic lime preferably in finely divided form or in water suspension and this brings down, with the magnesia of the dolomite, the magnesium hydroxide which had been held in organic solution in the waste liquor. Both these magnesia components may be removed by filter-pressing, the filtrate being the calcium waste liquor which may be used for preliminarily removing the sulphates, etc. as above indicated. This magnesia is preferably purified by calcining to eliminate any traces of combined organic material, and then it may be dissolved by carbon dioxide treatment under pressure to produce the acid magnesium carbonate or bicarbonate of magnesium. This solution may advantageously be filter-pressed which thus removes any silica or other insoluble material; and the solution may then be treated with magnesium acid sulphite which produces the normal sulphite of magnesia and liberates concentrated carbon dioxide which may be reused in the other step of the process to the extent necessary, and the surplus sold. A surplus of magnesia is also produced in this process which can be disposed of so as to help pay for the primary raw treating materials, dolomite and sulphur or pyrites. Part of the magnesium sulphite may be transformed into the bisulphite form by treatment with sulphur dioxide, for use in the foregoing step of the process. It is sometimes desirable, also to treat the calcined magnesia which may be produced as above described from the first waste liquor of the process with sulphur dioxide in water suspension to form magnesium monosulphite.

It is still more desirable, however, from the commercial standpoint to combine the sulphur dioxide directly with the magnesium hydroxide precipitated from the waste cooking liquor, which considerably shortens and cheapens the process. The waste magnesium monosulphite liquor from the digester may, therefore, be boiled with hydrated lime or preferably with hydrated dolomitic lime containing sufficient calcium hydroxide to precipitate, as magnesium hydroxide, all of the magnesium present in the waste liquor. When this boiling treatment has proceeded sufficiently to precipitate practically all of the magnesium hydroxide, the treated liquor may be filter-pressed which removes this precipitated magnesium hydroxide which may then be suspended in water and transformed into the monosulphite in various ways as by treating it with sulphur dioxide gas by percolating the gas through the water suspended magnesium hydroxide preferably under pressures somewhat above atmospheric pressure. Magnesium monosulphite is thus produced which may be directly used in many cases for the cooking liquor in the manufacture of paper pulp or other fibrous material from raw vegetable fibre of various kinds. If desired, however, the precipitated magnesium hydroxide may be calcined to eliminate any traces of organic material and may be sold as such or may be treated in water suspension with carbon dioxide under pressure to produce the soluble magnesium bicarbonate which may be filtered out and transformed into the monosulphite in any desired way, as by being combined with the proper proportions of magnesium bisulphite. This forms the desired magnesium monosulphite while concentrated carbon dioxide is simultaneously liberated which may be used for dissolving the magnesia as above described.

This invention has been described in connection with a number of illustrative materials, proportions, conditions, arrangements and orders of steps, to the details of which disclosure the invention is not of course to be limited, since what is claimed as new and what is desired to be secured by Letters Patent is set forth in the appended claims.

I claim:

1. The process of treating the waste magnesium monosulphite treating liquor from the digestion of vegetable fibrous material, which comprises boiling the treating liquor with powdered slaked dolomitic lime to precipitate magnesium hydroxide from said treating liquor and treating said magnesium hydroxide with material comprising available sulphur dioxide to form magnesium monosulphite adapted for use in such treating liquor.

2. The process of treating the waste magnesium monosulphite treating liquor from the digestion of vegetable fibrous material, which comprises boiling the treating liquor with slaked lime to precipitate magnesium hydroxide from said treating liquor and treating said magnesium hydroxide with material comprising available sulphur dioxide to form magnesium monosulphite adapted for use in such treating liquor.

3. The process of treating the waste magnesium monosulphite treating liquor from the digestion of vegetable fibrous material, which comprises reacting on hot treating liquor with slaked dolomitic lime to precipitate magnesium hydroxide from said treating liquor, and filtering out and treating said magnesium hydroxide with material comprising available sulphur dioxide to form magnesium monosulphite for use in such treating liquor.

4. The process of treating the waste magnesium monosulphite treating liquor from the digestion of vegetable fibrous material, which comprises reacting on the treating liquor with slaked lime to precipitate magnesium hydroxide from said treating liquor, and treating said magnesium hydroxide with material comprising available sulphur dioxide to form magnesium monosulphite for use in such treating liquor.

5. The process of treating the waste magnesium monosulphite treating liquor from the digestion of vegetable fibrous material, which comprises boiling the treating liquor with slaked dolomitic lime and precipitating and separating magnesium hydroxide from said treating liquor, and forming from said magnesium hydroxide magnesium monosulphite adapted for use in such treating liquor.

6. The process of treating the waste magnesium monosulphite treating liquor from the digestion of vegetable fibrous material, which comprises boiling the treating liquor with slaked lime and precipitating and separating magnesium hydroxide from said treating liquor, and forming from said magnesium hydroxide magnesium monosulphite adapted for use in such treating liquor.

7. The process of treating the waste magnesium monosulphite treating liquor from the digestion of vegetable fibrous material, which comprises precipitating and removing sulphates or sulphites from the treating liquor by treatment with organic lime compounds, reacting on the purified treating liquor with slaked dolomitic lime to precipitate and remove magnesium hydroxide from said treating liquor and form organic lime compounds for use with the original liquor, and forming from said magnesium hydroxide magnesium monosulphite for use in such treating liquor.

8. The process of treating the waste magnesium monosulphite treating liquor from the digestion of vegetable fibrous material, which comprises precipitating and removing sulphates or sulphites from the treating liquor by treatment with lime compounds, reacting on the purified treating liquor with slaked lime to precipitate and remove magnesium hydroxide from said treating liquor and forming from at least part of said magnesium hydroxide magnesium monosulphite for use in such treating liquor.

VIGGO DREWSEN.